Figure 1:
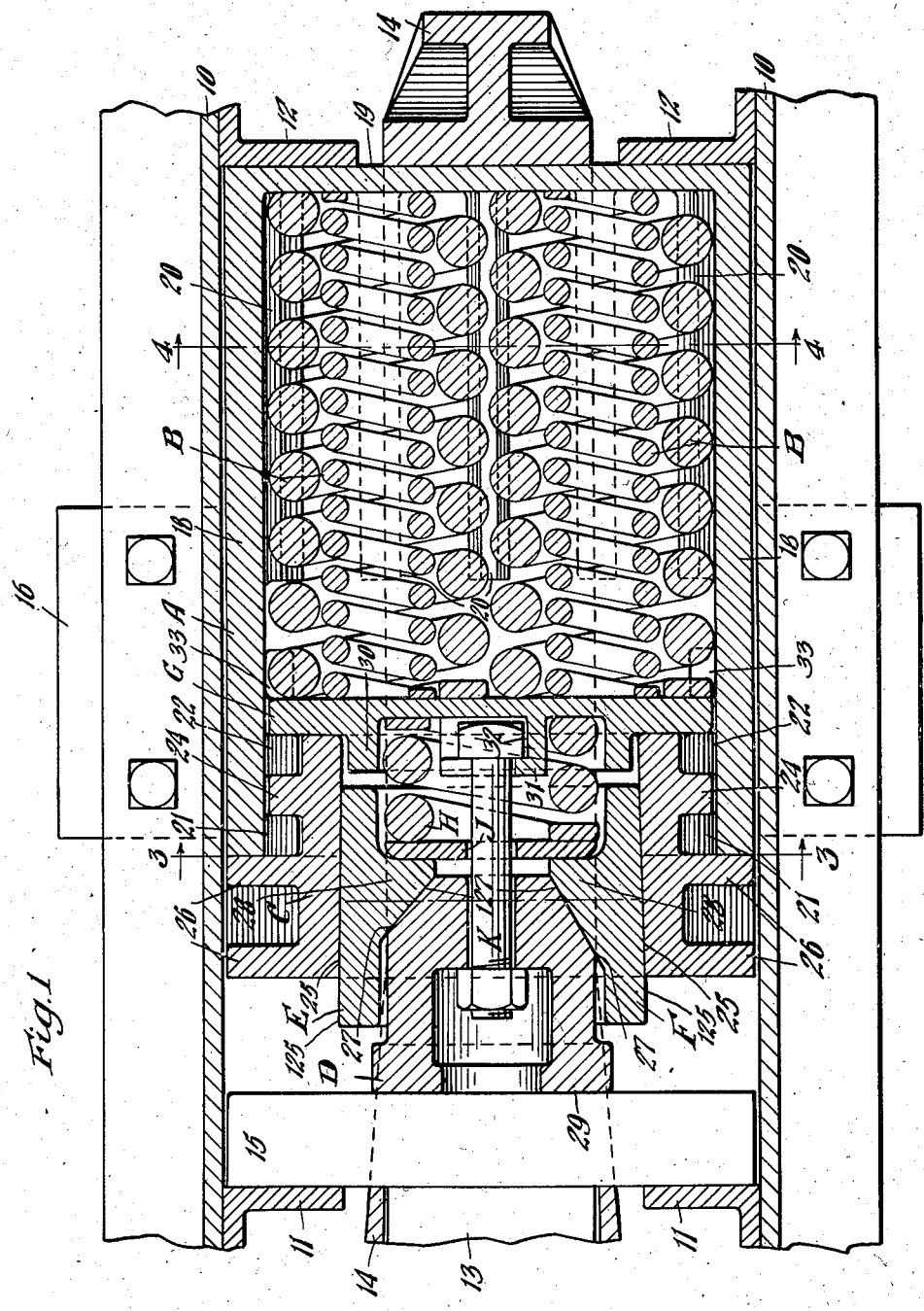

March 22, 1927.

J. F. O'CONNOR 1,621,517

FRICTION SHOCK ABSORBING MECHANISM

Filed July 18, 1925  2 Sheets-Sheet 1

Witness
Wm. Geiger

Inventor
John F. O'Connor
By George I Haight
His Atty.

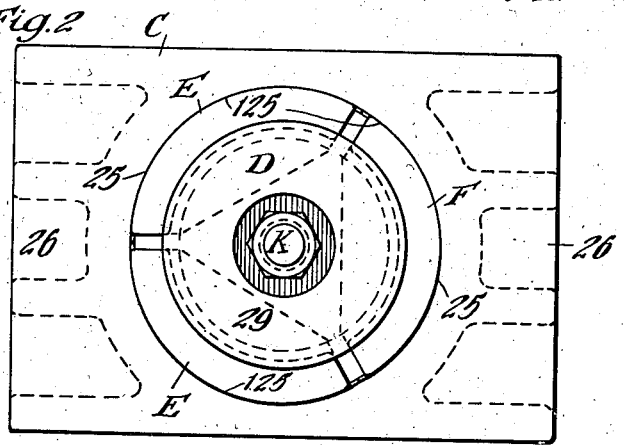
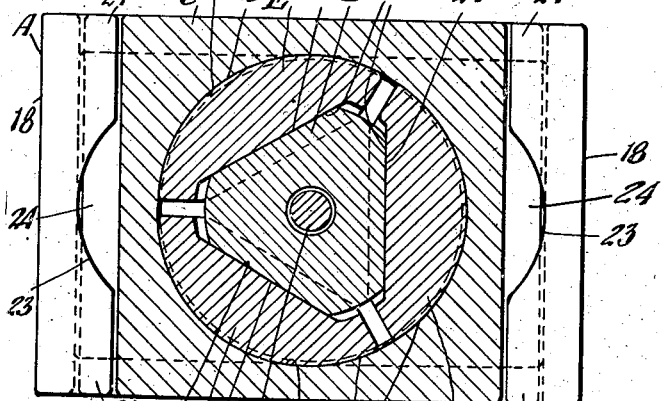
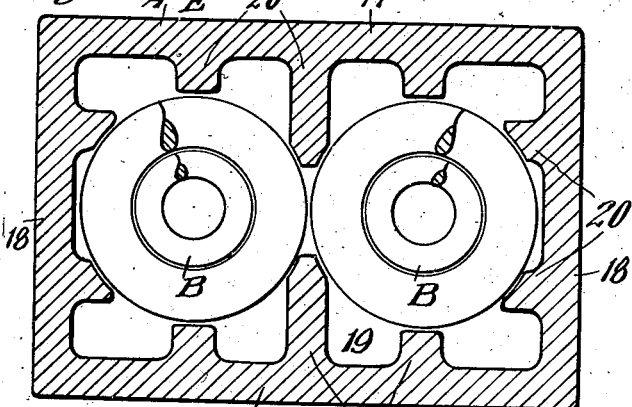

Patented Mar. 22, 1927.

1,621,517

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 18, 1925. Serial No. 44,420.

This invention relates to improvements in friction shock absorbing mechanisms.

One object of the invention is to provide a friction shock absorbing mechanism especially adapted for railway draft riggings, including a spring cage and a detachable friction shell having a friction wedge system co-operating therewith, wherein the spring cage is open at one end only and all the walls thereof are substantially solid to provide great column strength.

A further object of the invention is to provide a friction shock absorbing mechanism of the character indicated, including a spring cage casting open at one end only and having all the walls thereof solid and housing twin arranged spring elements, occupying substantially the entire width of the cage; a friction shell detachably connected to the cage, the shell being of an internal diameter less than the internal width of the cage and having a friction wedge system co-operating therewith; and a spring follower within the cage, the parts being so designed and proportioned that the twin springs and spring follower are freely insertable through the open end of the cage.

Other and further objects of the invention will more fully and clearly appear from the description and claims hereinafter following.

In the drawings, forming a part of this specification, Figure 1 is a longitudinal, sectional view of a portion of a railway draft rigging showing my improvements in connection therewith, the section through the friction elements corresponding to two intersecting planes at an angle of 120° to each other. Figure 2 is a front end elevational view of the shock absorbing mechanism proper. And Figures 3 and 4 are transverse vertical sectional views corresponding respectively to the lines 3—3 and 4—4 of Figure 1.

In said drawings, 10—10 indicate channel-shaped draft sills of a railway car underframe, to the inner surfaces of which are secured front stop lugs 11—11, and rear stop lugs 12—12. The inner end of the draw lugs is indicated by 13, to which is operatively connected a hooded, cast yoke 14 of well known form. The shock absorbing mechanism proper, hereinafter more fully described, as well as the main front follower 15 are disposed within the yoke. The yoke and the parts therewithin are supported in operative position by a detachable saddle plate 16.

The improved shock absorbing mechanism proper, as shown, comprises broadly, a casing A; twin arranged spring resistance elements B—B; a friction shell C; a wedge block D; friction shoes E, E and F; a spring follower G; an auxiliary spring resistance H; an auxiliary spring follower J; and a retainer bolt K.

The casing A is of generally rectangular form having horizontally disposed spaced top and bottom walls 17—17, vertically disposed spaced longitudinal side walls 18—18 and a transverse rear end wall 19. The end wall 19 co-operates with the rear stop lugs 12 in the manner of the usual rear follower. The casing is open at the front end and all the walls thereof are left solid to provide a column element of unusual strength. The top, bottom and side walls are reinforced by longitudinally disposed ribs 20—20. As most clearly shown in Figure 4, the ribs 20—20 extend from the rear wall to approximately the central portion of the casing. At the forward end of the casing the side walls are flanged inwardly as indicated at 21, thereby providing vertically disposed inner transverse shoulders. Inwardly of the flanges 21 the casing is also provided with vertically disposed interior, opposed ribs 22—22, each rib presenting front and rear shoulders. Between the flanges and the ribs the top and bottom of the casing is left open for a purpose hereinafter described. As most clearly shown in Figure 3, the flanges 21 and the ribs 22 are cut away intermediate their top and bottom ends to provide concave recesses 23.

The friction shell C is in the form of a substantially rectangular casting having opposed laterally projecting flanges 24 adjacent the rear end thereof, the flanges being adapted to be inserted between the flanges 21 and ribs 22 of the casing and snugly fit the opening therebetween. It will be evident that the shell is positively held against longitudinal movement with reference to the casing by the inter-engaging ribs and flanges. The friction shell is provided with three interior, true cylindrical friction surfaces 25—25, converging inwardly of the mechanism. The surfaces 25—25 are so disposed that the inner ends form a complete and true circle.

The friction shell is also provided with laterally projecting spaced reinforcing flanges 26—26 at the forward end thereof, the inermost flanges 26 being adapted to abut the outer end of the casing A, when the parts are assembled.

The friction shoes E, E and F are of similar construction, except as hereinafter pointed out. Each shoe is formed with an outer, true, cylindrical friction surface 125, adapted to co-operate with the corresponding shell friction surface 25 and an inner wedge face 27 formed on the front side of the lateral enlargement 28 on the shoe. The faces 27 of the two shoes E extend at a relatively blunt angle with respect to the longitudinal axis of the mechanism and the face 27 of the shoe F extends at a relatively keen angle to said axis. The rear faces of the enlargements 28 bear on the auxiliary spring follower J, which is in the form of a disc. The auxiliary spring follower J in turn bears on the forward end of the auxiliary spring resistance H.

The wedge D is in the form of a cast block suitably cored and having a flat front face 29 adapted to bear directly against the inner side of the front follower 15. At the inner end, the block D is provided with three rearwardly converging wedge faces 127—127, arranged around the axis of the mechanism. Two of the faces 127 co-act with the faces 27 of the two blunt angled shoes E and are correspondingly inclined thereto, whereas the remaining wedge face 127 of the block is inclined to correspond with the wedge face of the shoe F and is adapted to co-operate therewith.

The main spring follower is in the form of a relatively heavy substantially rectangular plate having lateral side extensions between the top and bottom edges thereof corresponding in external contour to the recesses 23 of the flanges 21 and ribs 22. At the forward side, the spring follower plate G is provided with an annular flange 30, adapted to co-operate with the inner ends of the friction shoes to limit relative movement of the latter and the spring follower. The outer side of the spring follower abuts the inner end of the auxiliary spring resistance H, which is seated within the annular flange 30. At the forward side, the spring follower G is also provided with a central boss 31 recessed as indicated at 32 to receive the head of the retainer bolt K and is slotted as shown to accommodate the shank of the bolt. As clearly shown in Figure 1, the recess 32 is open at one side to permit lateral insertion of the bolt head. The outer end of the bolt K is anchored to the wedge block D, the nut of the bolt being accommodated within the recess thereof. The retainer bolt K is adapted to maintain the parts of uniform overall length, and hold the spring H under initial compression.

The twin arranged main spring resistance elements B comprise two units, each unit including a light inner coil and a relatively heavier outer coil. The springs B are interposed between the spring follower G and the transverse end wall 19 of the casing A. In the normal, full released position of the parts, the spring follower G abuts the inner end of the friction shell and limits the expansion of the spring B, the latter being preferably under initial compression. In this position of the parts, the annular flange 30 of the spring follower projects into the friction shell, as most clearly shown in Figure 1, preventing lateral displacement of the shell. As most clearly shown in Figure 4, the ribs 20 in addition to functioning as a reinforcing means for the casing also serve to hold the spring units in position, each of the ribs having the outer edge thereof cut away to correspond to the exterior contour of the corresponding spring unit. The top and bottom walls of the casing are each provided with three ribs, the central rib of each set projecting between the two members of the twin springs.

The mechanism is assembled as follows: The main springs B are first placed within the casing by inserting them through the open end thereof, and the spring follower is then placed in position and the parts compressed to a predetermined extent until the spring follower clears the recesses 33 provided in the top and bottom walls of the casing at opposite sides thereof. Temporary key elements are then inserted within the recesses 33 to retain the spring follower in position with the main springs compressed. In this connection it is pointed out that the main springs and the spring follower are freely insertable through the front end of the casing A, inasmuch as the flanges 21 and the ribs 22 are cut away as hereinbefore pointed out to provide proper clearance. The friction shell is next assembled with the casing A by laterally inserting the ribs 24 between the corresponding flanges 21 and ribs 22 of the casing, the top and bottom casing walls being cut away as hereinbefore pointed out to facilitate assembling. After the friction shell has been assembled with the casing A the temporary retaining keys are removed, permitting the spring follower G to be projected outwardly into engagement with the inner end of the shell. The friction wedge shoes E, E and F, auxiliary spring H, auxiliary spring follower J and the wedge block D are then assembled with the shell and secured in position by the retainer bolt K.

The operation of my improved shock absorbing mechanism, assuming the compression stroke, is as follows: The follower 15 and the casing A will be moved relatively toward each other causing the wedge block D to be forced inwardly of the mechanism urging the friction shoes apart and placing the same in intimate contact with the friction surfaces of the shell. During the continued inward movement of the wedge, the friction shoes will be carried inwardly of the shell until they engage the flange 30 of the spring follower G, whereupon the spring follower G will be forced rearwardly in unison with the friction shoes and wedge, compressing the main spring resistance elements B. The described action will continue either until the actuating force is reduced or until inward movement of the follower 15 is arrested by engagement with the outer end of the friction shell C. The force will then be transmitted directly through the shell C and the casing A to the rear stop lugs 12. When the actuating force is reduced, the springs B and H will return the parts to normal position, outward movement of the spring follower being limited by engagement with the inner end of the friction shell, as hereinbefore pointed out. Outward movement of the main wedge D will be limited by the bolt K which is anchored to the spring follower G, and the wedge will in turn limit the outward movement of the friction shoes E, E and F.

It will be evident that there will be substantially only slight wedging action between the blunt faces of the wedge and shoes, developed by differential action, due to tapered shell, while a true wedging action will be effected between the co-operating keen faces of the wedge and shoe F. Due to the wedging action there will be a slight expansion of the friction shell, thereby storing up energy therein whereby the shell will forcibly contract when the actuating pressure is removed, creating lateral inward pressure on the blunt faced shoe E and facilitating release of the main wedge due to the releasing angle of the cooperating faces of the main wedge and the shoes E. Due to the employment of the blunt and keen sets of wedge faces, I am enabled to obtain a very high wedging action during the compression stroke, since the keen wedge faces may be made relatively acute without danger of the parts sticking, the blunt wedge faces acting more or less as "safety valves". In this connection, it will be understood by those skilled in the art that my improvements are capable of use in a mechanism either employing a blunt and keen angle system of wedge faces, or wedge faces which are all of the same angle with respect to the axis of the mechanism.

From the preceding description taken in connection with the drawings it will be evident that I have provided an exceedingly simple mechanism which may be easily assembled and which has unusually great column strength. By so designing the spring casing that the component parts of the mechanism, including the main spring resistance elements and the spring follower may be entered through the end of the casing, there is no necessity for leaving the side walls of the casing open, as has heretofore been the practice in gears of this type, thus leaving the side walls intact, and materially adding to the column strength of the casing.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a friction shell having retaining means thereon; of a casing open at one end and having retaining means for the shell at said open end for limiting the relative movement of the shell and casing longitudinally, said casing rearwardly of the shell forming a spring cage having substantially continuous top, bottom, side and end walls; twin arranged springs within the casing occupying substantially the entire available spring space thereof and adapted to be inserted through the open end of said cage, the retaining means of said casing being recessed to permit free insertion of said springs; a spring follower within the casing; and a friction wedge system cooperating with the friction shell.

2. In a friction shock absorbing mechanism, the combination with a spring cage open at one end; of a spring resistance within said cage; a detachable friction shell, said shell and cage having interengaging ribs thereon for preventing relative longitudinal movement thereof, the ribs of said cage being recessed to provide clearance for insertion of the spring resistance through the open end of the cage; and wedge friction shoes cooperative with the shell.

3. In a friction shock absorbing mechanism, the combination with a spring cage open at one end; of a spring resistance within said cage; a detachable friction shell, said shell and cage having interengaging ribs thereon for preventing relative longitudinal movement thereof, the ribs of said cage being recessed to provide clearance for insertion of the spring resistance through the open end of the cage; wedge friction shoes cooperating with the shell; and a spring follower having a portion thereof normally projecting into the shell to prevent lateral displacement thereof with reference to the cage.

4. In a friction shock absorbing mechanism, the combination with a substantially rectangular spring cage, said cage being open at one end only; of twin arranged main springs and a spring follower within said cage; a detachable friction shell, said shell and cage having cooperating retaining means, the retaining means of the cage being cut away to permit free entrance of the spring follower and springs through the open end of the cage; and a friction wedge system cooperating with the shell.

5. In a friction shock absorbing mechanism, the combination with a spring cage, open at one end only; of twin arranged, coiled, spring units within the spring cage, said units being disposed in transverse alignment, the combined exterior diameters of said units approximating the width of the cage; a spring follower within the cage, said twin spring units and spring follower being freely insertable through the open end of the cage; a friction shell having interior, cylindrical friction surfaces; top and bottom ribs on each of the side walls of said cage for preventing movement of the shell longitudinally thereof, said top and bottom ribs being spaced apart to provide clearance to permit insertion of the springs through the front end of the cage; friction shoes cooperating with said shell; and a wedge pressure transmitting element cooperating with the shoes.

6. In a friction shock absorbing mechanism, the combination with a rectangular casing open at one end; of a friction shell having interior cylindrical friction surfaces; ribs on the casing for detachably holding the shell against longitudinal movement with reference to the casing; a spring resistance within said casing; a spring follower within the cage, said spring follower being of greater width than the friction shell, said ribs being cut away to permit insertion of the spring follower and spring resistance through the front end of the shell; friction shoes within the friction shell; a wedge cooperating with the shoes; an auxiliary spring resistance interposed between the friction shoes and follower.

In witness that I claim the foregoing I have hereunto subscribed my name this 15th day of July, 1925.

JOHN F. O'CONNOR.